US009697201B2

(12) United States Patent
Gao et al.

(10) Patent No.: US 9,697,201 B2
(45) Date of Patent: Jul. 4, 2017

(54) ADAPTING MACHINE TRANSLATION DATA USING DAMAGING CHANNEL MODEL

(71) Applicant: Microsoft Technology Licensing, LLC, Redmond, WA (US)

(72) Inventors: Qin Gao, Bellevue, WA (US); William D. Lewis, Seattle, WA (US); Nicholas William Ruiz, Trento (IT)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 14/552,200

(22) Filed: Nov. 24, 2014

(65) Prior Publication Data
US 2016/0147740 A1 May 26, 2016

(51) Int. Cl.
*G06F 17/28* (2006.01)
*G10L 15/06* (2013.01)
(Continued)

(52) U.S. Cl.
CPC .......... *G06F 17/289* (2013.01); *G10L 15/063* (2013.01); *G06F 9/4448* (2013.01);
(Continued)

(58) Field of Classification Search
CPC ....... G10L 15/22; G10L 15/30; G10L 15/265; G06F 17/289; G06F 17/2872; G06F 9/4448
(Continued)

(56) References Cited

U.S. PATENT DOCUMENTS 7,099,826 B2 * 8/2006 Akabane ................. G10L 13/00
704/260
8,204,739 B2 6/2012 Waibel
(Continued)

FOREIGN PATENT DOCUMENTS

KR 20140004541 A 1/2014

OTHER PUBLICATIONS

Aue, et al., "MSR-FBK IWSLT 2013 SLT System Description," IWSLT 2013, International Workshop on Spoken Language Translation, 10th IWSLT, Heidelberg, Dec. 5-6, 2013, 8 pages.
(Continued)

*Primary Examiner* — Vu B Hang
(74) *Attorney, Agent, or Firm* — Lee & Hayes, PLLC (57) ABSTRACT

A speech-to-speech (S2S) translation system may utilize a damaging channel model to adapt machine translation (MT) training data so that a MT engine of the S2S translation system that is trained with the adapted training data can make better use of output received from an automated speech recognition (ASR) engine of the S2S translation system. The S2S translation system may include a MT training module that uses MT technology in order to simulate a particular ASR engine output by treating the ASR engine as a "noisy channel". A process may include modeling ASR errors of a particular ASR engine based at least in part on output of the ASR engine to create an ASR simulation model, and performing machine translation to generate training data based at least in part on the ASR simulation model. The MT engine of the S2S translation system may then be trained using the generated training data.

20 Claims, 5 Drawing Sheets

(51) Int. Cl.
  *G10L 15/22* (2006.01)
  *G06F 9/44* (2006.01)
  *G10L 15/26* (2006.01)
(52) U.S. Cl.
  CPC .......... *G06F 17/2872* (2013.01); *G10L 15/22* (2013.01); *G10L 15/265* (2013.01)
(58) Field of Classification Search
  USPC ....................................... 704/2, 8, 231, 235
  See application file for complete search history.

(56) References Cited

U.S. PATENT DOCUMENTS

| | | | |
|---|---|---|---|
| 8,442,830 | B2 | 5/2013 | Nakajima |
| 8,504,351 | B2 | 8/2013 | Waibel et al. |
| 8,731,944 | B2 | 5/2014 | Seligman |
| 2007/0271088 | A1* | 11/2007 | Waibel .................. G06F 17/275 704/9 |
| 2013/0046530 | A1 | 2/2013 | Och et al. |
| 2014/0025366 | A1 | 1/2014 | Georgiev et al. |
| 2014/0297252 | A1 | 10/2014 | Prasad et al. |

OTHER PUBLICATIONS

Cettolo, et al., "Report on the 10th IWSLT Evaluation Campaign", In Proceedings of the 10th International Workshop for Spoken Language Translation, Dec. 5, 2013, 18 pages.
Chen, et al., "An Empirical Study of Smoothing Techniques for Language Modeling," In Proceedings of the 34th Annual Meeting of the ACL, Jun. 1996, 10 pages.
Falavigna, et al., "FBK @ IWSLT 2012—ASR Track", In Proceedings of International Workshop on Spoken Language Translation, Dec. 6, 2012, 6 pages.
Falavigna, et al., "FBK @ IWSLT 2013—ASR Tracks", In Proceedings of the 10th International Workshop for Spoken Language Translation, Dec. 5, 2013, 4 pages.
Hassan, et al., "Matrex: The DCU Machine Translation System for IWSLT 2007", In Proceedings of the International Workshop on Spoken Language Translation, Oct. 15, 2007, 7 pages.
He, et al., "Indirect-HMM-based Hypothesis Alignment for Combining Outputs from Machine Translation Systems", In Proceedings of the Conference on Empirical Methods in Natural Language Processing, Oct. 25, 2008, 10 pages.
He, et al., "Joint Optimization for Machine Translation System Combination", In Proceedings of the Conference on Empirical Methods in Natural Language Processing, Aug. 6, 2009, 10 pages.
He, Xiaodong, "Using Word-Dependent Transition Models in HMM Based Word Alignment for Statistical Machine Translation", In Proceedings of the Second Workshop on Statistical Machine Translation, Jun. 23, 2007, 8 pages.
He, et al., "Robust Speech Translation by Domain Adaptation", In Proceedings of 12th Annual Conference of the International Speech Communication Association, Aug. 28, 2011, 4 pages.
Koehn, et al., "Moses: Open Source Toolkit for Statistical Machine Translation", In Proceedings of the 45th Annual Meeting of the ACL on Interactive Poster and Demonstration Sessions, Jun. 25, 2007, 4 pages.
Kurata, et al., "Training of Error-Corrective Model for ASR Without Using Audio Data," 2011 IEEE, IBM Research—Tokyo, 1623-14 Shimotsuruma, Yamato-shi, Kanagawa, 242-8502, Japan, 3 pages.
Li, et al., "Incremental HMM Alignment for MT System Combination", In Proceedings of the Joint Conference of the 47th Annual Meeting of the ACL and the 4th International Joint Conference on Natural Language Processing of the AFNLP, Aug. 2, 2009, 9 pages.
Menezes, et al., "Syntactic Models for Structural Word Insertion and Deletion during Translation", In Proceedings of the Conference on Empirical Methods in Natural Language Processing, Oct. 2008, 10 pages.
Moore, et al., "Faster Beam-search Decoding for Phrasal Statistical Machine Translation", In Proceedings of Machine Translation Summit XI, Sep. 2007, 7 pages.
Ng, et al., "Adaptation of Lecture Speech Recognition System with Machine Translation Output", In Proceedings of IEEE International Conference on Acoustics, Speech and Signal Processing, May 26, 2013, 5 pages.
Peitz, et al., "Modeling Punctuation Prediction as Machine Translation", In Proceedings of International Workshop on Spoken Language Translation, Dec. 8, 2011, 8 pages.
Prasad, et al., "Active Error Detection and Resolution for Speech-to-Speech Translation", In Proceedings of International Workshop on Spoken Language Translation, Dec. 6, 2012, 8 pages.
Rosti, et al., "Review of Hypothesis Alignment Algorithms for MT system Combination via Confusion Network Decoding", In Proceedings of the Seventh Workshop on Statistical Machine Translation, Jun. 7, 2012, 9 pages.
Rousseau, et al., "TED-LIUM: An Automatic Speech Recognition Dedicated Corpus", In Proceedings of the Eight International Conference on Language Resources and Evaluation, May 23, 2012, 5 pages.
Sagae, et al., "Hallucinated N-Best Lists for Discriminative Language Modeling", In Proceedings of IEEE International Conference on Acoustics, Speech and Signal Processing, Mar. 25, 2012, 4 pages.
Seide, et al., "Conversational Speech Transcription Using Context-Dependent Deep Neural Networks", In Proceedings of International Speech Communication Association, Aug. 28, 2011, 4 pages.
Seide, et al., "Feature Engineering in Context-Dependent Deep Neural Networks for Conversational Speech Transcription", In Proceedings of IEEE Workshop on Automatic Speech Recognition and Understanding, Dec. 2011, 6 pages.
Su, et al., "Error Back Propagation for Sequence Training of Context-Dependent Deep Networks for Conversational Speech Transcription", In proceedings of IEEE International Conference on Acoustics, Speech, and Signal Processing, May 26, 2013, 5 pages.
Tan, et al., "Automatic Speech Recognition System Channel Modeling", In Proceedings of the 37th Annual International Symposium on Computer Architecture, Jun. 19, 2010, 4 pages.
Tsvetkov, et al., "Augmenting Translation Models with Simulated Acoustic Confusions for Improved Spoken Language Translation," Language Technologies Institute, Carnegie Mellon University, Pittsburgh, PA 15213, 10 pages.
Yu, et al., "Roles of Pretraining and Fine-Tuning in Context-Dependent DNN-HMMs for Real-World Speech Recognition", In Proceedings of NIPS Workshop on Deep Learning and Unsupervised Feature Learning, Dec. 2010, 8 pages.

\* cited by examiner

ADAPTING MACHINE TRANSLATION DATA USING DAMAGING CHANNEL MODEL

BACKGROUND

Speech-to-speech (S2S) translation systems utilize various components to receive spoken/audible input in a source language, and provide synthesized audible output in a target language. Examples of some of the main components include an automatic speech recognition (ASR) engine to convert audio input into text-based output in the source language, a machine translation (MT) engine to translate the source language text output by the ASR engine into text-based output in the target language, and, in some cases, a text-to-speech (TTS) engine to convert the target language text output by the MT engine into synthesized audio output in the target language.

In an S2S translation system, the translation quality of the MT engine depends on the data it uses in training (i.e., training data). Current translation systems implement MT engines that are trained on highly edited text corpora, which are not suitable for translating spontaneous speech. That is, the data that is output by the ASR engine is typically conversational and disfluent, whereas the edited, written training data used to train the MT engine is typically formal and fluent. This leads to a significant mismatch between the output of the ASR engine and the input expected by the MT engine, thus hindering the MT engine's ability to output an accurate translation for a given utterance received by the ASR engine. This, in turn, leads to providing poor translations that are ultimately output in the target language to an end user. Moreover, there are few corpora of spontaneous speech paired with text translations in a target language that could otherwise be used for training an MT engine on ASR output, and it is impractical to manually create a sufficient volume of such training data. Thus, MT engines remain poorly trained for implementation within a S2S translation system.

SUMMARY

Described herein are techniques and systems for using a "damaging" channel model to adapt machine translation (MT) training data so that a MT engine trained with the adapted training data can make better use of output received from an automated speech recognition (ASR) engine. That is, when the ASR engine is coupled with the MT engine as part of a speech-to-speech (S2S) translation system, the MT engine that is trained with the adapted MT training data may provide translations with improved accuracy for a given input utterance that is received by the ASR engine. According to various embodiments, a S2S translation system may include a MT training module that uses MT technology in order to simulate the output from a particular ASR engine by treating the ASR engine as a "noisy channel" that maps input phonetic transcripts into text-based recognition results.

In many S2S translation systems, the input that is received by the MT engine is often "noisy" due to various discontinuities between ASR output and formal written text. For example, ASR output can contain disfluencies (e.g., restarts, filled pauses, repetitions, word deletions, etc.). ASR output can also contain tokens in their pronounced form. For example, the token "1990" can have different pronounced forms based on its context; namely "nineteen ninety" or "one thousand nine hundred ninety." ASR output often lacks explicit segmentation into sentences, reliable casing, and punctuation. Symbols may sometimes be pronounced and sometimes ignored, depending on the context, and text can be normalized into canonical form in the ASR output. In addition, ASR output can contain ASR errors, which may stem from: (i) homophone confusions (e.g., "theirs" vs. "there's", "two" vs. "to", "I see" vs. "icy", etc.), (ii) reference words not appearing in the ASR engine's lexicon (also referred to as "out of vocabulary" (OOV) words), (iii) misrecognized phonemes (e.g., "is" vs. "its"), or biases from the ASR language model, among other possible ASR errors.

MT engines that are trained solely on written text often have no way to recover the correct input when such ASR errors occur, which may be the case with third party ASR engines that are essentially "black boxes" from the perspective of the MT engine. In this context, the techniques and systems disclosed herein attempt to model the aforementioned ASR errors via a "simulated" ASR engine that uses MT technology to generate "ASR-like" output for MT training purposes. In this manner, the MT engine of the S2S translation system can better anticipate the ASR errors that are made by the ASR engine.

The MT training data may be adapted using a two-stage "damaging" process. In the first stage, an MT training module learns how to "damage" (i.e., adapt or convert) bilingual written text to resemble the output of a particular ASR engine. In the second stage, the MT training module actually "damages" the bilingual written text using what it learned in the first stage, which results in adapted MT training data that is ultimately used to train the MT engine of the S2S translation system.

In some embodiments, the first stage of the aforementioned two-stage process includes modeling ASR errors of a particular ASR engine based at least in part on output of the ASR engine to create an ASR simulation model. In the second stage of the two-stage process, the ASR simulation model may be used with a MT engine used to generate the adapted MT training data. This generated training data may then be used to train the MT engine that operates on actual input of the S2S translation system (i.e., the audio input is received by the ASR engine and processed to create source language text, which is then passed to the MT engine as source language text input) so that the MT engine can accurately translate text in a source language into text in a target language.

By adapting MT training data using the techniques and systems disclosed herein, a higher quality S2S translation system may be implemented for any ASR engine. In other words, because the MT training data is adapted based on the output of a particular ASR engine that is used in the S2S translation system, the techniques and systems disclosed herein customize the MT engine for the particular ASR engine, allowing the same customization for other types of ASR engines. Furthermore, there is no need to create or acquire a corpus of new training data (i.e., bilingual speech corpora); rather, existing bilingual text corpora can be leveraged and adapted to train MT engines. An S2S translation system incorporating the techniques and systems disclosed herein may further improve user's experience by outputting more accurate and robust translations in a target language, thereby simplifying usage and reducing iterative attempts at communicating, thus reducing network bandwidth usage and increasing processing speed of the system due to reduced traffic.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Example System

Figure 1:
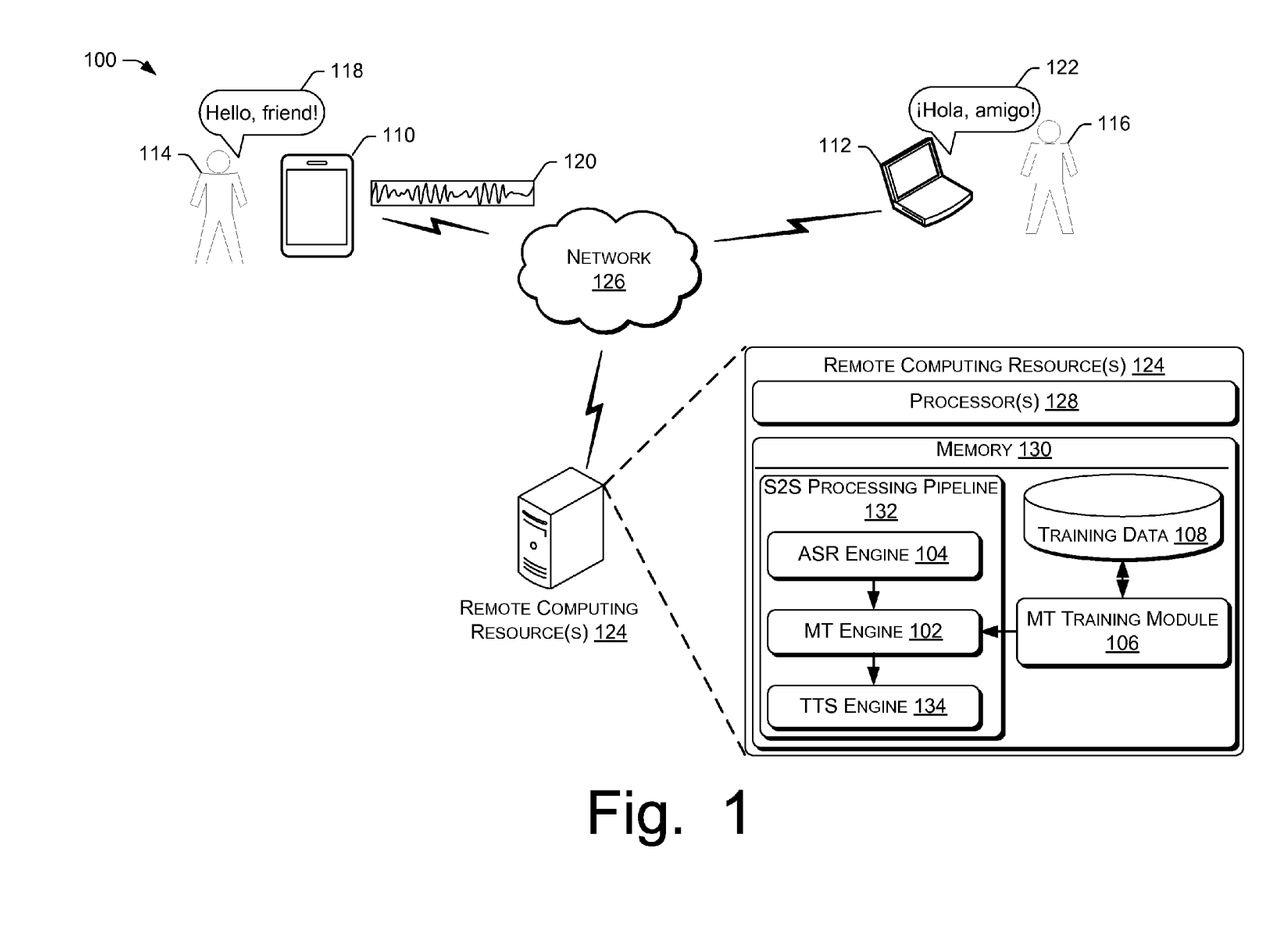
FIG. 1 is a schematic diagram of an example architecture of a speech-to-speech (S2S) translation system having a machine translation (MT) engine trained with adapted MT training data to provide translations with improved accuracy.

FIG. 1 is a schematic diagram of an example architecture of a speech-to-speech (S2S) translation system 100 configured to provide translations in a target language with improved accuracy. The system 100 may be configured to train a machine translation (MT) engine 102 to make better use of output text that it receives from an automated speech recognition (ASR) engine 104. In order to train the MT engine 102, the system 100 includes a machine translation (MT) training module 106 that is configured to model ASR errors of the ASR engine 104 based at least in part on the output of the ASR engine 104, and use that model (referred to herein as an "ASR simulation model", or a "adaptation model") to adapt training data 108 (i.e., adapt existing written training data to generate suitable MT training data) that is used to train the MT engine 102 for better performance in conjunction with the ASR engine 104. This process of adapting the training data 108 will be described in more detail below. It is to be appreciated that the S2S translation system 100 is merely one example of a suitable S2S translation system 100, and the techniques described herein are not limited to performance using the system 100 of FIG. 1.

The system 100 may include a client device 110, and a client device 112. The client devices 110 and 112 may each be implemented as any type of computing device including, but not limited to, a mobile phone (e.g., a smart phone), a tablet computer, a portable digital assistant (PDA), an electronic book (e-book) reader, a portable game player, a portable media player, a game console, a set-top box (STB), a smart television (TV), a personal computer, a laptop computer, vehicle computer, and so forth. FIG. 1 shows a representative client device 110 in the form of a tablet computer, and a representative client device 112 in the form of a notebook computer.

The client device 110 may be associated with a first user 114 who may speak a source language, such as English. The client device 112 may be associated with a second user 116 who may speak a target language, such as Spanish. As used herein, the source language represents a different language than the target language such that the MT engine 102 operates by translating input in the source language to output in the target language.

The client devices 110 and 112 may each include, or may be connectable to, one or more input devices for interfacing with the client devices 110, 112. The input device(s) may be embedded in the client devices 110, 112 or may be peripherally connected wired or wireless input devices. Such input devices may include, without limitation, a microphone(s), a pointing device (e.g., a mouse, joystick, etc.), physical buttons, a remote control, a camera(s), a touch screen display, and/or any other suitable input device. In the context of the S2S translation system 100, the user 114 may provide or speak an utterance 118 in the source language of English, such as "Hello, friend!" That utterance may be received by a microphone(s) of the client device 110 and encoded in an audio signal 120.

The client devices 110 and 112 may each further include one or more output devices for providing output to the users 114, 116 of the client devices 110, 112. The output device(s) may include, without limitation, a display, speakers, tactile feedback mechanisms, a printer, and so on. For example, a speaker(s) of the client device 112 may provide audio output 122 to the user 116 in the target language that corresponds to the input utterance 118, which in this example is the audible phrase "¡Hola, amigo!" (the Spanish translation of "Hello, friend!" in English). In some implementations, a display of the client device 112 may provide a visual output of the translated text in the target language in addition to, or in lieu of, the audio output 112. For instance, the client device 112 may be configured to receive instant messages, Short Message Service (SMS) text messages, or a general transcription as part of a video conferencing application in order to provide visual output to the user 116 via an associated display.

Although the S2S translation system 100 is shown as providing one-way translation (i.e., receiving spoken input utterance 118 at client device 110 and providing synthesized audio output 122 at client device 112, it is to be appreciated that the system 100 may be configured as a multi-directional (e.g., bi-directional) S2S translation system 100 to provide real-time S2S translation between the participating users 114, 116 in any direction. For example, the user 116 may provide a spoken input utterance that is ultimately translated to the language of the user 114 and output as synthesized audio and/or visual output to the user 114 by the client device 110. Various implementations of the S2S translation system 100 are contemplated herein, including, without limitation, video conferencing applications, SMS text services, instant messaging services, digital assistant services, and so on.

The client devices 110, 112 may further include one or more communication connections that allow the client devices 110, 112 to communicate with (transmit/receive data to/from) one or more remote computing resources 124 (e.g., one or more servers) via a network 126. The network 126 may represent any one or combination of multiple different types of wired and/or wireless networks, such as cable networks, the Internet, local area networks, mobile telephone networks, wide area networks, or a combination of such networks The remote computing resource(s) 124 is shown as including one or more processors 128 and one or more forms of computer-readable memory 130. The processor(s) 128 may be configured to execute instructions, applications, engines, or programs stored in the memory 130. In some embodiments, the processor(s) 128 may include hardware processors that include, without limitation, a hardware central processing unit (CPU), a field programmable gate array (FPGA), a complex programmable logic device (CPLD), an application specific integrated circuit (ASIC), a system-on-chip (SoC), or a combination thereof.

The remote computing resource(s) 124 may also include additional data storage devices, such as removable storage and/or non-removable storage. Computer-readable media may include two types of computer-readable media, namely computer storage media and communication media. The memory 130, removable storage, and/or non-removable storage are all examples of computer storage media. Computer storage media may include volatile and non-volatile, removable, and non-removable media implemented in any method or technology for storage of information, such as computer readable instructions, data structures, program modules, or other data. Computer storage media includes, but is not limited to, random access memory (RAM), read-only memory (ROM), erasable programmable read-only memory (EEPROM), flash memory or other memory technology, compact disc read-only memory (CD-ROM), DVD, or other optical storage, magnetic cassettes, magnetic tape, magnetic disk storage or other magnetic storage devices, or any other non-transmission medium that may be used to store the desired information and which may be accessed by remote computing resource(s) 124. Any such computer storage media may be part of remote computing resource(s) 124. In general, computer storage media may include computer-executable instructions that, when executed by the processor(s) 128, perform various functions and/or operations described herein.

In contrast, communication media embody computer-readable instructions, data structures, program modules, or other data in a modulated data signal, such as a carrier wave, or other transmission mechanism. As defined herein, computer storage media does not include communication media.

The memory 130 may include multiple components as part of a S2S processing pipeline 132 that are configured to convert a received audio signal (e.g., the audio signal 120) in a source language into target language output that is provided to the terminal client device (e.g., the client device 112), which may then provide the target language translation as audio output 122. The components of the S2S processing pipeline 132 may include the aforementioned ASR engine 104, the aforementioned MT engine 102, and optionally, a text-to-speech (TTS) engine 134 to allow for text-to-speech processing. In operation, the ASR engine 104 may be configured to receive and process utterances in the form of an audio signal, such as the audio signal 120, in order to transcribe source language utterances by converting speech-to-text, and providing text-based recognition results as output to the MT engine 102. In some embodiments, the data received by the ASR engine 104 may include features that have been extracted from the audio signal 120, a compressed audio signal, or other intermediate representations of the audio signal 120 that allow the ASR engine 104 to recognize the content of the audio signal 120. The MT engine 102 may be configured to translate, with use of a decoder, the text-based recognition results received from the ASR engine 104 from text in the source language into text in the target language. In some instances, the output of the MT engine 102 is provided to the TTS engine 134 to process the text in the target language by converting it into a synthesized speech output, such as an audio signal that is processed at the client device 112 and output as the audio output 122 via the speaker(s) of the client device 112.

Both the ASR engine 104 and the MT engine 102 may rely on various models developed through machine learning techniques to determine how to convert speech to text and how to convert source language text to target language text. Models used by the ASR engine 104 may include one or more acoustic models that map sounds to candidate words or phrases. Language models (such as n-gram language models) may also be utilized by the ASR engine 104 and the MT engine 102 to provide an indication of which candidate words or phrases are more likely to be correct, given multiple candidate words/phrases that the engines can choose to provide as output. The ASR language model may be built using text corpora of the particular language (e.g., the source language) to model probabilities of source language words, while the MT language model is used to model target side language probabilities. Furthermore, the MT engine 102 may utilize one or more translation models that establish a relationship (a probabilistic mapping) between text in one language to text in another language, where text can be a word, a phrase, or some other type of linguistic building block(s). For example, $P(T|S)$ may represent the probability of the target language text given the source language text. The techniques and systems disclosed herein describe how to build a modified version of an MT translation model for use by the MT engine 102. This modified MT translation model attempts to simulate the ASR engine 104 behavior (e.g., statistically model likely misrecognitions from the ASR engine 104) to make better use of the ASR engine 104 output. This modified MT translation model is therefore more robust with respect to both ASR errors, text normalization issues, and stylistic differences between the ASR outputs and the conventional bilingual text data used to train MT systems. Accordingly, this model is (referred to herein as an "ASR simulation model" or "adaptation model"), as will be described in more detail with reference to FIG. 2.

The aforementioned MT training module 106 may build the ASR simulation model based in part on output of the ASR engine 104 that is utilized in the S2S translation system 100. In this sense, the MT engine 102 may be trained for use with any type of ASR engine 104, regardless of the differences in ASR output accuracy (ASR errors). After building the ASR simulation model, the MT training module 106 may use machine translation (e.g., via its own MT engine) to generate the training data 108 used to train the MT engine 102 used for translation of actual source language input. Because the training data 108 is generated from edited, bilingual text corpora that is typically available for training MT engines, the training data 108 that is generated by the MT training module 106 may be considered as having been "adapted" or "damaged" (i.e., the original written training data is processed and changed per the ASR simulation model) to anticipate ASR errors in the output of the ASR engine 104.

It is to be appreciated that, although FIG. 1 shows the specific implementation of the client devices 110, 112 in communication with the remote computing resource(s) 124 via a network 126, the architecture of the S2S translation system 100 is not so limited. For example, the network 126 may be omitted, in some embodiments, and the various components and devices of FIG. 1 may be implemented as a single, integrated device, without a network 126 per se, the device including the client devices 110, 112 and the remote computing resource(s) 124. Moreover, the client device 110 and the remote computing resource(s) 124 may be combined into a single device, which may be configured to communicate with the client device 112 via the network 126.

Similarly, the client device 112 and the remote computing resource(s) 124 may be combined into a single device, which may be configured to communicate with the client device 110 via the network 126. In some embodiments, the client device 110 and the client device 112 may be combined into a single device, which may be configured to communicate with the remote computing resource(s) 124 via the network 126.

Example Processes

FIGS. 2-5 illustrate example processes that may be carried out to perform the techniques described herein. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. Moreover, in some embodiments, one or more blocks of the processes may be omitted entirely.

Figure 2:
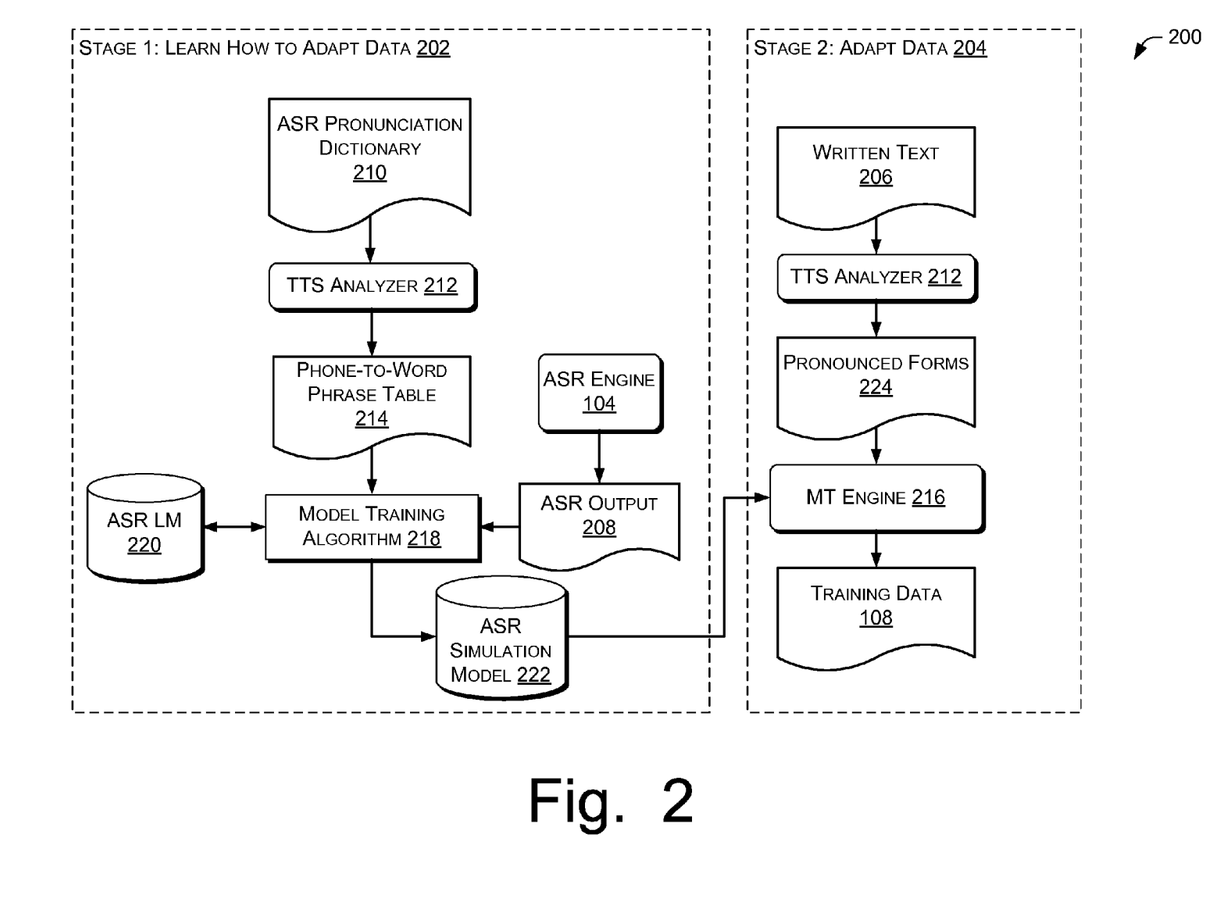
FIG. 2 is a schematic diagram of an example two-stage adapting process for adapting MT training data.

FIG. 2 is a schematic diagram of an example two-stage "damaging" process 200 for adapting MT training data 108. For convenience, the process 200 is described with reference to the S2S translation system 100 of FIG. 1. Particular reference may be made to the MT engine 102, the MT training module 106, and the training data 108.

In a first stage 202 of the two-stage process 200, the MT training module 106 learns how it will carry out the second stage 204 of the process 200 where parallel written text 206 is processed (i.e., "damaged," adapted, or converted) into the training data 108 ultimately used to train the MT engine 102. That is, what the MT training module 106 learns from the first stage 202 may be used for processing the written text 206 in the second stage 204 to obtain training data 108 that resembles the output 208 of the ASR engine 104. The first stage 202 can therefore be characterized as modeling the ASR errors of the ASR engine 104 based at least in part on the output 208 of the ASR engine 104.

Initially, an ASR pronunciation dictionary 210 (the space known to the ASR engine 104, or the ASR engine's lexicon) is processed through a text-to-speech (TTS) analyzer 212 (which may be the same or different TTS engine/analyzer to that of the TTS engine 134 of FIG. 1) to convert text (e.g., words and/or phrases) from the ASR pronunciation dictionary 210 into phoneme sequences, or sequences of other phonetic representation units, such as, without limitation, syllables, allophones, diphones, triphones, and so on. It is to be appreciated that the TTS analyzer 212 may vary in the level of its sophistication and complexity such that the TTS analyzer 212 may represent any type of phonetic analyzer from a simple word-to-phone mapping analyzer, or a phonetic analyzer with more complexity. The sequences output by the TTS analyzer 212 may be maintained in a phone-to-word phrase table 214, which may store in any suitable data storage format, such as a relational database format. For example, the phrase "I see" may be processed by the TTS analyzer 212 into the synthesized phonetic sequence "iy s ih". Additionally, the word "icy" may be processed by the TTS analyzer 212 into the phonetic sequence "iy s ih". This may be performed on each word and/or phrase of the ASR pronunciation dictionary 210 to generate the phone-to-word phrase table 214 having phoneme sequences mapped to their corresponding lexical forms. As such, the phone-to-word phrase table 214 may have multiple entries for any given phoneme sequence if two different words are pronounced the same way (homophones). This provides a plurality of "hypotheses" for the phoneme sequences in the table 214. The phone-to-word phrase table 214 may be used as parallel training data for training a MT engine 216 used in the second stage 204, where the phoneme sequences correspond to the source/input data and the words or lexical forms correspond to the target/output data of the parallel training data. This is because the MT engine 216 used in the second stage 204 of the process 200 may comprise a phoneme-to-word MT engine 216 (in contrast to translating between source and target languages). The MT engine 216 may comprise, without limitation, a phrase-based MT engine 216, such as that described in R. C. Moore and C. Quirk, "Faster Beam-search Decoding for Phrasal Statistical Machine Translation," In Proceedings of MT Summit XI 2007, a word-based MT engine, or a Finite-State-Transducer, a phone-to-phone transducer and phone-to-word transducer combination, or the like. In some embodiments, the MT engine 216 may be a monotonic MT engine.

In some embodiments, the TTS analyzer 212 may be utilized to generate additional phoneme sequences for individual words in the ASR pronunciation dictionary 210 in order to expand the set of phoneme sequences to cover more possible confusable phonemes in the phone-to-word phrase table 214. This may provide contextual data that can be used to determine a most likely pronunciation for a word that has multiple possible pronunciations. For example, the word "read" may be mapped to the same phoneme sequence as "reed". However, an additional phoneme sequence, matching the pronunciation of "red" may be generated to expand the table 214 to have both possible pronunciations that may occur in different contexts. For example, the word "read" in the sentence "I read a book yesterday" would be pronounced as "red", whereas the same word in the sentence "I like to read books" would be pronounced as "reed." In order to generate the additional phoneme sequences for individual words in the ASR pronunciation dictionary 210, the TTS analyzer 212 may perform text-to-speech analysis on each transcript line of a corpus of text (e.g., the written text 206). For example, the common word "the" may be pronounced contextually as "th ih" or "th uh". Pronunciations for word entries not appearing in the ASR pronunciation dictionary 210 may be ignored, according to some embodiments. With this contextual data added to the phone-to-word phrase table, the MT engine 216 may learn to translate the phoneme sequence "iy s ih rohd" into the text-based phrase "icy road", while translating the phoneme sequence "iy s ih th uh rohd" into the text-based phrase "I see the road". Moreover, the MT engine 216 may be better equipped to translate a given phoneme sequence into the most appropriate word and mitigate generation of synthetic errors that don't match the original ASR engine 104.

In some embodiments, the MT training module 106 may capture count statistics on each phoneme sequence-to-word mapping as they occur within a corpus of text (e.g., the written text 206). These counts may be used to rank the forward and backward probabilities of the phone-to-word phrase table 214 by $$\frac{1}{(1+r)},$$

where r is the rank of the phoneme sequence-to-word mapping.

As noted above, the ASR engine 104 may produce recognition results in the ASR output 208 having ASR errors. Continuing with the above example, the ASR engine 104 may receive the spoken utterance "I see" and output "icy" as the recognition result in the ASR output 208. Without trying to correct or modify the ASR engine 104 itself, the MT training module 106 may treat the ASR engine 104 as a "noisy channel" that receives "clean" phoneme sequences in a given language (e.g., the phoneme sequence for the English phrase "I see", that is, "iy s ih") and outputs "noisy" text in the given language (e.g., English word "icy"). Thus, the MT training module 106 may retrieve the ASR output 208 (e.g., by randomly sampling a set from the 1-best ASR outputs) and use the phonetic transcripts corresponding to the ASR output 208 as input to a model training algorithm 218 to tune or adjust the model weights of an ASR language model 220 used by the ASR engine 104. The phone-to-word phrase table 214 may be assigned uniform forward and backward phrase probabilities to each phoneme sequence-to-word mapping before the model weights are tuned. The weights of the ASR language model 220 may correspond to likelihoods or probabilities of candidate words and/or phrases in the ASR language model 220 for choosing the best output of the phoneme-to-word conversion problem. In other words, due to the uniform probabilities in the phone-to-word phrase table 214, the ASR language model 220 may be used to discriminate between phoneme-to-word conversion hypotheses that may have equal probability. The weights of the phone-to-word phrase table 214 may also be tuned using the model training algorithm 218. In some embodiments, the aforementioned forward and backward probabilities, $$\frac{1}{(1+r)},$$

of the phoneme sequence-to-word mapping in the phrase table 214 may be utilized by the model training algorithm 218 to tune the weights of the ASR language model 220. Any suitable training algorithm may be used as the model training algorithm 218, such as a minimum error rate training (MERT) algorithm, which tries to minimize the error rate on the target/output side of the parallel training data represented by the phone-to-word phrase table 214.

The model training algorithm 218 tunes the model weights toward the actual ASR output 208 known to the MT training module 106, resulting in an ASR simulation model 222 in the first stage 202 that tells the MT engine 216 how to translate phoneme sequences into text output just as the ASR engine 104 would do. Continuing with the above example, if the ASR engine 104 consistently recognizes the utterance "I see" as "icy" in the ASR output 208 due to homophone confusion (an ASR error), the ASR simulation model 222, which was trained on the actual ASR output 208 tells the MT engine 216 that it should more frequently translate the phoneme sequence "iy s ih" into "icy" (i.e., the ASR simulation model 222 matches, at least substantially, the actual ASR output 208 for a given input phoneme sequence in the phone-to-word phrase table 214). As another example, if the ASR engine 104 consistently converts an OOV word (i.e., a word not appearing in the ASR pronunciation dictionary 210) to a phonetically similar in-vocabulary word, the ASR simulation model 222 may be used to train the phrased-based MT engine 216 to also recognize this phone-to-word pairing and learn how to recover the OOV word in machine translation. The ASR simulation model 222 also allows MT to recover a misrecognized word or sequence of words, e.g., "icy" for "I see", and generate the correct translation. In this manner, the ASR simulation model 222 may be used to optimize the MT engine 216 to translate "clean" phoneme sequences that are in a source language into "noisy, ASR-like" text output.

In the second stage 204 of the two-stage process 200, the MT training module 106 processes the parallel written data 206 typically used for training the MT engine 102 through the TTS analyzer 212 (i.e., the same TTS analyzer 212 that is used in the first stage 202, for consistency) to produce synthesized phoneme sequences (pronounced forms 224) for the words in the corpus of written text 206. In some embodiments, a pronounced form 224 may be produced for each word of the corpus of written text 206 using the TTS analyzer 212. The pronounced forms 224 may be maintained as a table of phoneme sequences mapped to the words in the written text 206. Due to the existence of homophones and other pronunciation anomalies, such a table may have multiple entries for a single phoneme sequence. For example, the phoneme sequence "t uw" may be mapped to "two", "to," and "too," as well as to the numeral "2". As another example, the phoneme sequence "th air" may be mapped to "their", "there", or "they're".

The pronounced forms 224 are then translated by the MT engine 216 that has been trained on the ASR simulation model 222 into lexical forms (words and/or phrases) that resemble the ASR output 208. These translations are stored as the training data 108 along with the pronounced forms 224. The training data 108 may also include the parallel bitext of the written text 206 that maps text in a source language to text in a target language. In some embodiments, the synthesized pronounced forms 224 are concatenated with the written text 206 corresponding to those pronounced forms 224 within the training data. The result of the second stage 204 is a repository of training data 108 that was derived from "damaging" or adapting existing written text 206 per the adaptation model (shown in FIG. 2 as the ASR simulation model 222). The training data 108 generated by the second stage 204 may be used to train the MT engine 102 that operates on actual data received from the ASR engine 104 in the S2S translation system 100. In this manner, the MT engine 102 is equipped to anticipate ASR errors in the recognition results it receives from the ASR engine 104.

Figure 3:
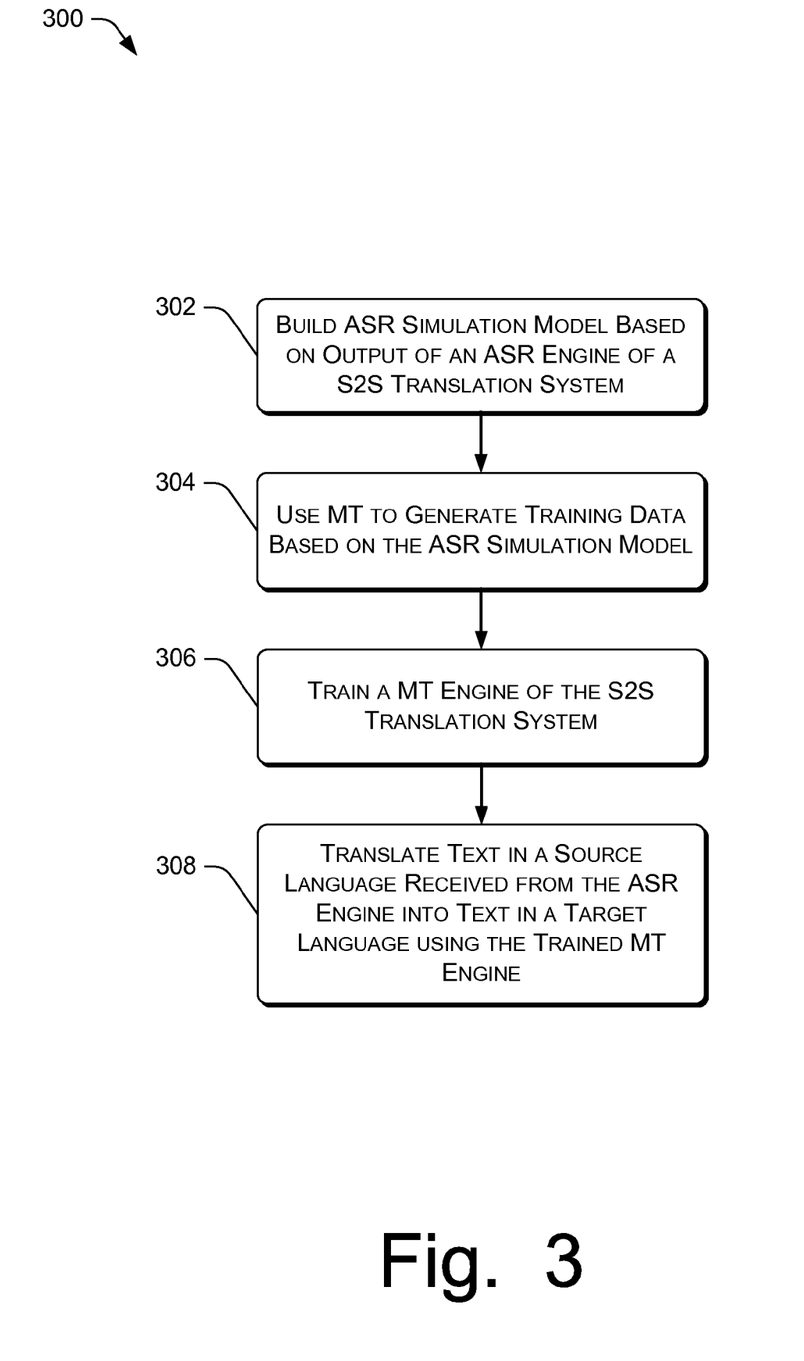
FIG. 3 is a flow diagram of an example process of adapting MT training data, training a MT engine with the adapted training data, and translating text into a target language using the trained MT engine.

FIG. 3 is a flow diagram of an example process 300 of adapting MT training data 108, then training a MT engine 102 with the adapted training data 108, and further translating text into a target language using the trained MT engine 102.

At 302, an ASR simulation model 222 may be built based on output 208 of an ASR engine 104 to be used in a S2S translation system 100. Particularly, the ASR simulation model 222 may be built using the ASR output 208 in order to model ASR errors.

At 304, a MT engine 216 may generate training data 108 based at least in part on the ASR simulation model 208. The training data 108 that is generated may be derived from written text 206 corpora that is normally used to train MT engines for translation purposes. In this sense, the training data 108 resulting from the machine translation at 304 may be considered as "adapted" MT training data 108. In some embodiments a TTS analyzer 212 may be used to convert parallel written text 206 (i.e., bilingual text data) into corresponding phoneme sequences, which are then translated by the MT engine 216 (a phoneme-to-word MT engine) into text-based words and/or phrases that make up at least a portion of the training data 108. In some embodiments, the training data 108 generated at 304 may map the synthesized phoneme sequences to the text output by the phrase-based MT engine 216 such that the text output substantially matches the output 208 of the ASR engine 104 when the ASR engine 104 is provided the same phoneme sequences.

At 306, the training data 108 generated at 304 is used to train an MT engine 102 of the S2S translation system 100 that the ASR engine 104 is implemented in. Particularly, the mapping of source language phoneme sequences-to-text output in the training data 108, coupled with the parallel written text corpora that may be concatenated with the phone-to-word mappings, provides the MT engine 102 with sufficient data to machine learn how to translate source language text into target language text to preserve the original utterance 118 provided by the source language user 114. In other words, the MT engine 102 can be trained to anticipate ASR errors to then recover the actual word and/or phrase received by the ASR engine 104 and translate the actual word and/or phrase into the target language.

At 308, the trained MT engine 102 may translate source language text that it receives from the ASR engine 104 into target language text. The process 300 makes a S2S translation system 100 more reliable by translating source language speech into target language speech with higher accuracy and efficiency. This, in turn may yield more efficient communication between end users of the S2S translation system 100. Network bandwidth usage may be reduced by limiting iterative attempts at communicating the proper message to a recipient user. Moreover, by adapting MT training data to train an MT engine to make better use of ASR output, there is no need to generate a massive repository of new training data that would otherwise be required to properly train the MT engine to provide good translations of ASR output. Accordingly, memory may be conserved for the S2S translation system 100.

Figure 4:
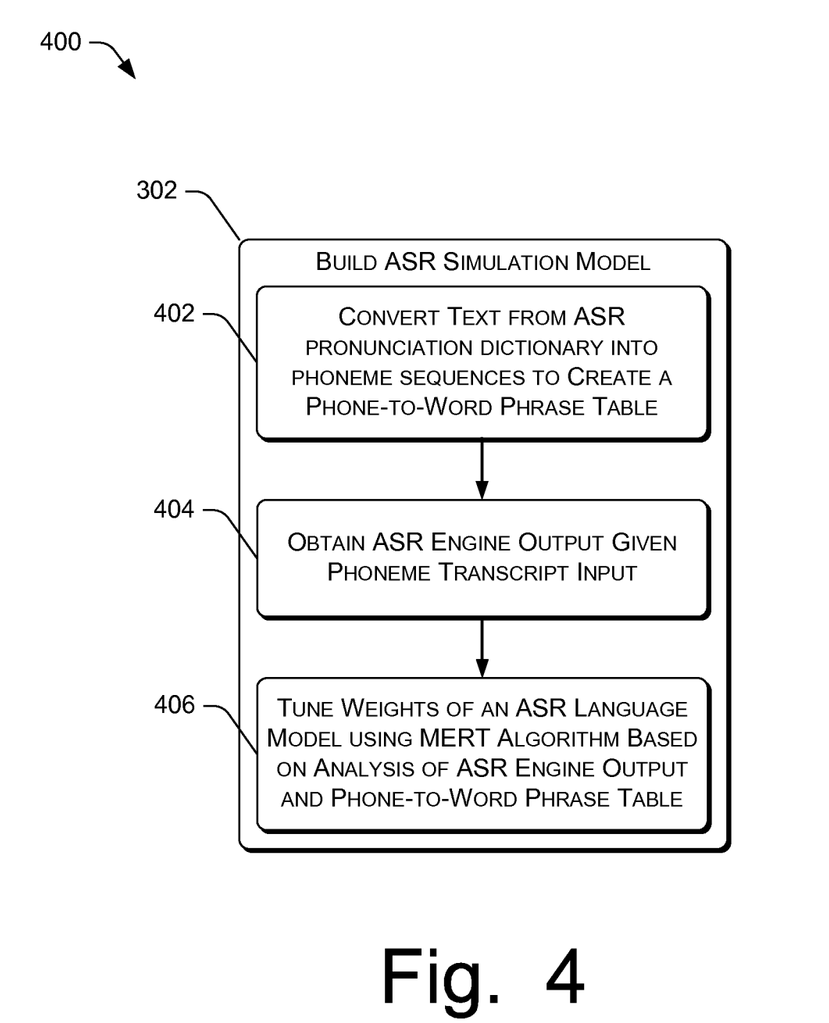
FIG. 4 is a flow diagram of an example sub-process of building an automated speech recognition (ASR) simulation model.

FIG. 4 is a flow diagram of an example sub-process 400 of step 302 of the process 300 shown in FIG. 3. Particularly, the process 400 may represent a process 400 of building an ASR simulation model 222 that is used to adapt MT training data 108.

At 402, text from an ASR pronunciation dictionary 210 may be converted into phoneme sequences using a TTS analyzer 212. The synthesized phoneme sequences may be maintained in a phone-to-word phrase table 214 that may represent parallel training data. In some embodiments, the TTS analyzer 212 may be used to perform text-to-speech analysis on each transcript line of a corpus of text (e.g., the written text 206) so that additional phoneme sequences may be generated and added to the table 214. This expanded set of phoneme sequences may provide contextual information that can be used in training downstream components.

At 404, output 208 from the ASR engine 104 may be obtained for phoneme sequence input, such as the phoneme sequences of the phone-to-word phrase table 214. At 406, the MT training module 106 may use a training algorithm 218 to tune the weights of an ASR language model 220 that is used to model the ASR errors. In some embodiments, the training algorithm 218 comprises a MERT algorithm. By tuning the weights of the ASR language model 220, an ASR simulation model 222 may be built that optimizes the translation from actual (clean) source language phoneme sequence input into source language ASR-like text output.

Figure 5:
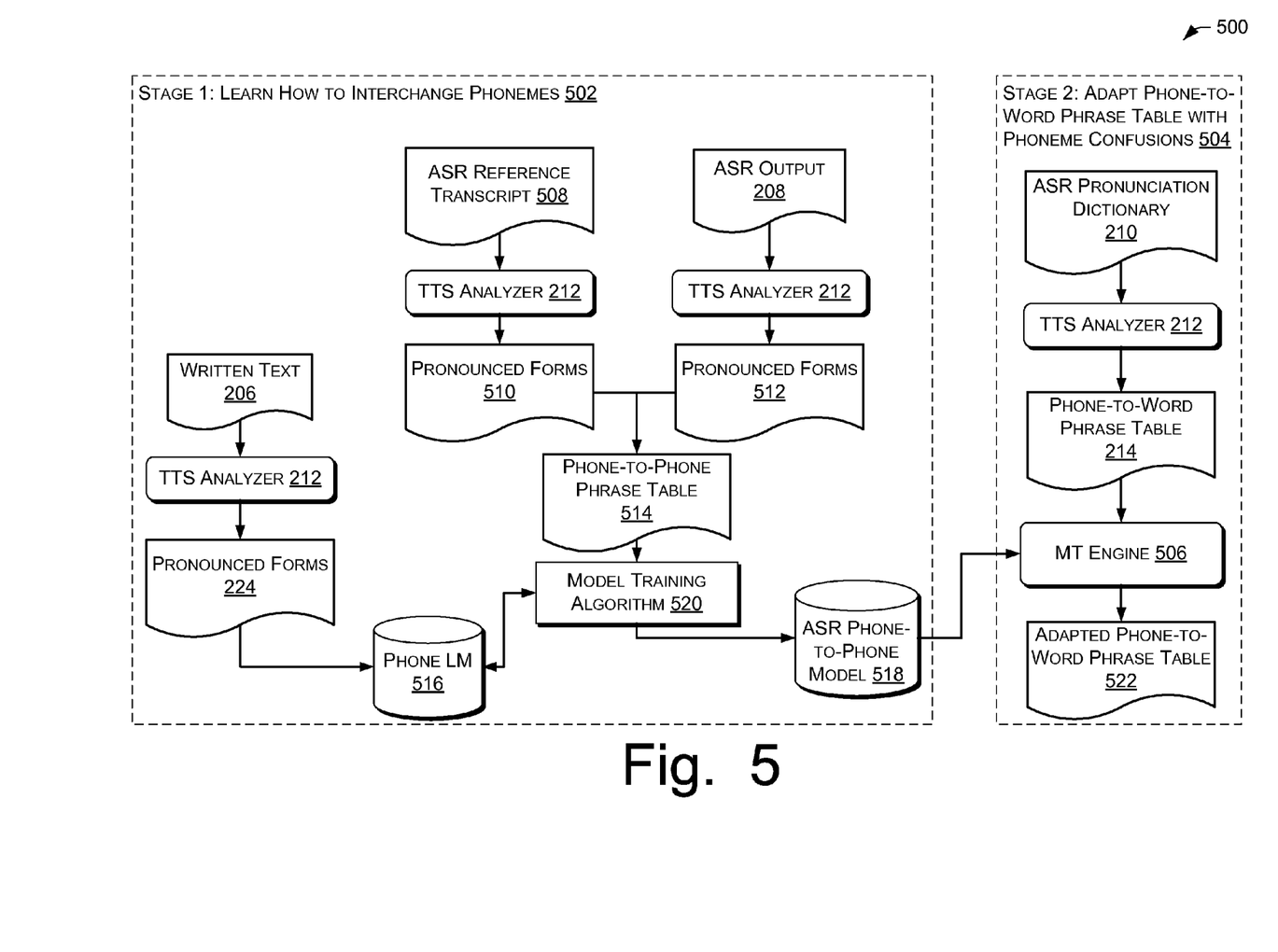
FIG. 5 is a schematic diagram of another example two-stage adapting process to augment an example phone-to-word phrase table.

FIG. 5 is a schematic diagram of another example two-stage adapting process 500 to augment a phone-to-word phrase table, such as the phone-to-word phrase table 214 of FIG. 2. For convenience, the process 500 is described with reference to the S2S translation system 100 of FIG. 1. Particular reference may be made to the MT engine 102, the MT training module 106, and the training data 108.

In a first stage 502 of the two-stage process 500, the MT training module 106 learns how to carry out the second stage 504 of the process 500 where a phone-to-word phrase table, such as the phone-to-word phrase table 214 of FIG. 2, may be augmented with pronunciation variants which are distortions of existing pronunciations. The purpose of the process 500 is to generate pronunciations of entries in the ASR pronunciation dictionary 210 (introduced in FIG. 2) that may have been distorted during the decoding process of the ASR engine 104.

The two-stage process 500 utilizes another MT engine 506 (e.g., a phrase-based MT engine) to map phoneme sequences of clean transcripts into "ASR-like" outputs. In the first stage 502, both an ASR reference transcript 508 and the ASR output 208 are transcribed into phoneme sequences (shown as pronounced forms 510 and pronounced forms 512, respectively) using the TTS analyzer 212 introduced in FIG. 2. These pronounced forms 510, 512 are treated as parallel training data to build a phone-to-phone phrase table 514.

A phoneme language model 516 may be estimated as follows: the written text 206 (introduced in FIG. 2) may be transcribed into the pronounced form 224 by means of the TTS analyzer 212, as described with reference to FIG. 2. The phoneme language model 516 may then be used in conjunction with the phone-to-phone phrase table 514 to build a phone-to-phone model 518. The weights of the phoneme language model 516 and the phone-to-phone phrase table 514 may be optimized using a model training algorithm 520 (which may be the same or similar algorithm to that of the model training algorithm as 218 of FIG. 2).

In the second stage 504 of the two-stage process 500, the existing phoneme sequences in the phone-to-word phrase table 214 are translated by the MT engine 506 using the ASR phone-to-phone model 518 trained in the first stage 502. The phoneme sequences in 214 may be translated into one or more alternative phoneme sequences represented by an adapted phone-to-word phrase table 522 in order to model potential distortions in the speech signal 120. The adapted phone-to-word phrase table 522 may then be used in the two-stage process 200 to train the MT engine 216.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example One: A speech-to-speech translation system comprising: one or more processors; and memory storing instructions that are executable by the one or more processors, the memory including (e.g., storing): an automated speech recognition (ASR) engine executable by the one or more processors to convert audio input in a source language into text output in the source language; a machine translation (MT) engine executable by the one or more processors to receive the text output in the source language from the ASR engine and machine translate the text output in the source language into text output in a target language that is different than the source language; and a MT training module executable by the one or more processors and configured to: model ASR errors of the ASR engine based at least in part on output of the ASR engine to create an ASR simulation model; perform MT to generate training data based at least in part on the ASR simulation model; and automatically train the MT engine using the training data.

Example Two: The system of Example One, wherein the MT training module comprises a text-to-speech (TTS) analyzer to convert (or transform) text from an ASR pronunciation dictionary into synthesized phoneme sequences, and wherein the ASR simulation model is based at least in part on the synthesized phoneme sequences.

Example Three: The system of any of the previous examples, alone or in combination, wherein the TTS analyzer is further configured to generate additional phoneme sequences for individual words in the ASR pronunciation dictionary by performing text-to-speech analysis on each transcript line of a corpus of text.

Example Four: The system of any of the previous examples, alone or in combination, wherein the memory maintains the phoneme sequences and the additional phoneme sequences mapped to respective words of the ASR pronunciation dictionary, and wherein the MT training module is further configured to: capture count statistics within the corpus of text for unique phoneme sequence-to-word pairs; and rank forward and backward probabilities of the unique phoneme sequence-to-word pairs based at least in part on the count statistics.

Example Five: The system of any of the previous examples, alone or in combination, wherein the MT training module comprises a text-to-speech (TTS) analyzer to convert bilingual text into phoneme sequences.

Example Six:

The system of any of the previous examples, alone or in combination, wherein the MT training module further comprises a phoneme-to-word MT engine to generate the training data, the training data mapping the phoneme sequences to output text that substantially matches the output of the ASR engine when the ASR engine is provided the phoneme sequences.

Example Seven: The system of any of the previous examples, alone or in combination, wherein the MT training module uses a training algorithm to tune a plurality of weights of an ASR language model that is used to model the ASR errors.

Example Eight: The system of any of the previous examples, alone or in combination, wherein the training algorithm comprises a minimum error rate training (MERT) algorithm.

Example Nine: A computer-implemented method comprising: modeling automated speech recognition (ASR) errors of an ASR engine based at least in part on output of the ASR engine to create an ASR simulation model; using a first machine translation (MT) engine to generate training data based at least in part on the ASR simulation model; automatically training a second MT engine using the training data; machine translating, by the second MT engine, text in a source language received from the ASR engine into text in a target language that is different than the source language; and converting (or transforming), using a text-to-speech (TTS) engine, the text in the target, different language to synthesized speech in the target language.

Example Ten: The computer-implemented method of Example Nine, further comprising: converting bilingual text into phoneme sequences; and translating the phoneme sequences into output text using the first MT engine in order to generate the training data, such that the output text substantially matches the output of the ASR engine when the ASR engine is provided the phoneme sequences.

Example Eleven: The computer-implemented method of any of the previous examples, alone or in combination, further comprising tuning, using a training algorithm, a plurality of weights of an ASR language model that is used to model the ASR errors.

Example Twelve: The computer-implemented method of any of the previous examples, alone or in combination, wherein the training algorithm comprises a minimum error rate training (MERT) algorithm.

Example Thirteen: The computer-implemented method of any of the previous examples, alone or in combination, further comprising converting text from an ASR pronunciation dictionary into phoneme sequences, wherein the ASR simulation model is based at least in part on the phoneme sequences.

Example Fourteen: The computer-implemented method of any of the previous examples, alone or in combination, wherein the phoneme sequences are mapped to individual words of the ASR pronunciation dictionary to obtain parallel training data for the first MT engine, the method further comprising training the first MT engine using the parallel training data.

Example Fifteen: A computer-readable storage medium comprising a memory storing programming instructions that are executable by one or more processors to cause performance of acts comprising: modeling automated speech recognition (ASR) errors of an ASR engine based at least in part on output of the ASR engine to create an ASR simulation model; performing machine translation (MT) to generate training data based at least in part on the ASR simulation model; automatically training a MT engine using the training data; machine translating, by the MT engine, text in a source language received from the ASR engine into text in a target language that is different than the source language; and converting (or transforming), using a text-to-speech (TTS) engine, the text in the target language to synthesized speech in the target language.

Example Sixteen: The computer-readable storage medium of Example Fifteen, the acts further comprising: converting bilingual text into phoneme sequences; and performing the MT to translate the phoneme sequences into output text in order to generate the training data, such that the output text substantially matches the output of the ASR engine when the ASR engine is provided the phoneme sequences.

Example Seventeen: The computer-readable storage medium of any of the previous examples, alone or in combination, the acts further comprising tuning, using a training algorithm, a plurality of weights of an ASR language model that is used to model the ASR errors.

Example Eighteen: The computer-readable storage medium of any of the previous examples, alone or in combination, wherein the training algorithm comprises a minimum error rate training (MERT) algorithm.

Example Nineteen: The computer-readable storage medium of any of the previous examples, alone or in combination, further comprising converting text from an ASR pronunciation dictionary into phoneme sequences, wherein the ASR simulation model is based at least in part on the phoneme sequences.

Example Twenty: The computer-readable storage medium of any of the previous examples, alone or in combination, wherein the phoneme sequences are mapped to individual words of the ASR pronunciation dictionary to obtain parallel training data that is used to learn how to machine translate input phoneme sequences into output text in a manner that models the output of the ASR engine when the ASR engine is provided the input phoneme sequences.

Example Twenty-One: A speech-to-speech translation system comprising: means for executing computer-executable instructions (e.g., processors, including, for example, hardware processors such as central processing units (CPUs), system on chip (SoC), etc.); and means for storing computer-executable instructions (e.g., memory, computer readable storage media such as RAM, ROM, EEPROM, flash memory, etc.) including: means for converting audio input in a source language into text output in the source language; means for translating configured to receive the text output in the source language from the means for converting audio input and translate the text output in the source language into text output in a target language that is different than the source language; and means for generating training data for the means for translating, the means for generating training data being configured to: model ASR errors of the means for converting audio input based at least in part on output of the means for converting audio input to create an ASR simulation model; perform MT to generate the training data based at least in part on the ASR simulation model; and train the means for translating using the training data.

Example Twenty-Two: The system of Example Twenty-One, wherein the means for generating training data comprises a means for converting text to speech that is configured to convert text from an ASR pronunciation dictionary into phoneme sequences, and wherein the ASR simulation model is based at least in part on the phoneme sequences.

Example Twenty-Three: The system of any of the previous examples, alone or in combination, wherein the means for generating training data further comprises a means for translating phoneme sequences-to-words for generating the training data, the training data mapping the phoneme sequences to output text that substantially matches the output of the means for converting audio input when the means for converting audio input is provided the phoneme sequences.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A speech-to-speech translation system comprising:
one or more processors; and
memory storing instructions that are executable by the one or more processors, the memory including:
an automated speech recognition (ASR) engine to convert audio input in a source language into text output in the source language;
a machine translation (MT) engine to receive the text output in the source language from the ASR engine and translate the text output in the source language into text output in a target language that is different than the source language; and
a MT training module configured to:
model ASR errors of the ASR engine based at least in part on the text output of the ASR engine to create an ASR simulation model;
train a phoneme-to-word MT engine with the ASR simulation model to create a trained phoneme-to-word MT engine;
convert, using the trained phoneme-to-word MT engine, phoneme sequences into output text, the output text matching the text output of the ASR engine given the phoneme sequences as input;
store the output text in association with the phoneme sequences as training data; and
train the MT engine using the training data.

2. The system of claim 1, wherein the MT training module uses a text-to-speech (TTS) analyzer to convert text from an ASR pronunciation dictionary into second phoneme sequences, and wherein the ASR simulation model is based at least in part on the second phoneme sequences.

3. The system of claim 2, wherein the TTS analyzer is further configured to generate additional phoneme sequences for individual words in the ASR pronunciation dictionary by performing text-to-speech analysis on each transcript line of a corpus of text.

4. The system of claim 3, wherein the memory maintains the second phoneme sequences and the additional phoneme sequences mapped to respective words of the ASR pronunciation dictionary, and wherein the MT training module is further configured to:
capture count statistics within the corpus of text for unique phoneme sequence-to-word pairs; and
rank forward and backward probabilities of the unique phoneme sequence-to-word pairs based at least in part on the count statistics.

5. The system of claim 1, wherein the MT training module comprises a text-to-speech (TTS) analyzer to convert, prior to converting the phoneme sequences into the output text, bilingual text that is used for training the MT engine into the phoneme sequences.

6. The system of claim 1, wherein the MT training module uses a training algorithm to tune a plurality of weights of an ASR language model that is used to model the ASR errors.

7. The system of claim 6, wherein the training algorithm comprises a minimum error rate training (MERT) algorithm.

8. A computer-implemented method comprising:
modeling automated speech recognition (ASR) errors of an ASR engine based at least in part on output of the ASR engine to create an ASR simulation model;

training a phoneme-to-word machine translation (MT) engine with the ASR simulation model to create a trained phoneme-to-word MT engine;

converting, using the trained phoneme-to-word MT engine, phoneme sequences into output text to generate training data, wherein the output text is mapped to the phoneme sequences in the training data, and wherein the output text matches the output of the ASR engine given the phoneme sequences as input;

training a MT engine using the training data;

translating, by the MT engine, text in a source language received from the ASR engine into text in a target language that is different than the source language; and converting the text in the target language to synthesized speech in the target language.

9. The computer-implemented method of claim 8, further comprising, prior to the converting the phoneme sequences into the output text:

converting bilingual text that is used for training the MT engine into the phoneme sequences.

10. The computer-implemented method of claim 8, further comprising tuning, using a training algorithm, a plurality of weights of an ASR language model that is used to model the ASR errors.

11. The computer-implemented method of claim 10, wherein the training algorithm comprises a minimum error rate training (MERT) algorithm.

12. The computer-implemented method of claim 8, further comprising converting text from an ASR pronunciation dictionary into second phoneme sequences, wherein the ASR simulation model is based at least in part on the second phoneme sequences.

13. The computer-implemented method of claim 12, wherein the second phoneme sequences are mapped to individual words of the ASR pronunciation dictionary to obtain parallel training data for the phoneme-to-word MT engine, wherein the training the phoneme-to-word MT engine further comprises training the phoneme-to-word MT engine using the parallel training data.

14. A computer storage medium comprising a memory storing programming instructions that are executable by one or more processors to cause performance of acts comprising:

modeling automated speech recognition (ASR) errors of an ASR engine based at least in part on output of the ASR engine to create an ASR simulation model;

training a phoneme-to-word machine translation (MT) engine with the ASR simulation model to create a trained phoneme-to-word MT engine;

converting, using the trained phoneme-to-word MT engine, phoneme sequences into output text to generate training data, wherein the output text is mapped to the phoneme sequences in the training data, and wherein the output text matches the output of the ASR engine given the phoneme sequences as input;

training a MT engine using the training data;

translating, by the MT engine, text in a source language received from the ASR engine into text in a target language that is different than the source language; and converting the text in the target language to synthesized speech in the target language.

15. The computer storage medium of claim 14, the acts further comprising, prior to the converting the phoneme sequences into the output text:

converting bilingual text that is used for training the MT engine into the phoneme sequences.

16. The computer storage medium of claim 14, the acts further comprising tuning, using a training algorithm, a plurality of weights of an ASR language model that is used to model the ASR errors.

17. The computer storage medium of claim 16, wherein the training algorithm comprises a minimum error rate training (MERT) algorithm.

18. The computer storage medium of claim 14, the acts further comprising converting text from an ASR pronunciation dictionary into second phoneme sequences, wherein the ASR simulation model is based at least in part on the second phoneme sequences.

19. The computer storage medium of claim 18, wherein the second phoneme sequences are mapped to individual words of the ASR pronunciation dictionary to obtain parallel training data for the phoneme-to-word MT engine, wherein the training the phoneme-to-word MT engine further comprises training the phoneme-to-word MT engine using the parallel training data.

20. The computer storage medium of claim 15, wherein the training data further includes the bilingual text.

* * * * *